US008429541B1

(12) United States Patent
Wisneski et al.

(10) Patent No.: US 8,429,541 B1
(45) Date of Patent: Apr. 23, 2013

(54) METHOD AND SYSTEM FOR VIDEO SHARING BETWEEN USERS OF AN APPLICATION

(75) Inventors: Jason M. Wisneski, San Francisco, CA (US); Russell A. Poole, San Francisco, CA (US); Joshua A. Brenner, San Francisco, CA (US); Colin J. Roper, La Jolla, CA (US)

(73) Assignee: Intuit Inc., Mountain View, CA (US)

( * ) Notice: Subject to any disclaimer, the term of this patent is extended or adjusted under 35 U.S.C. 154(b) by 565 days.

(21) Appl. No.: 12/432,965

(22) Filed: Apr. 30, 2009

(51) Int. Cl.
*G06F 3/00* (2006.01)

(52) U.S. Cl.
USPC .......................................................... 715/751

(58) Field of Classification Search ............... 715/751
See application file for complete search history.

(56) References Cited

U.S. PATENT DOCUMENTS

| | | | | |
|---|---|---|---|---|
| 5,119,493 A * | 6/1992 | Janis et al. | ..................... | 718/101 |
| 5,333,302 A * | 7/1994 | Hensley et al. | ................. | 714/37 |
| 7,620,895 B2 * | 11/2009 | Adkins et al. | ................. | 715/709 |
| 7,653,896 B2 * | 1/2010 | Herdeg, III | ..................... | 717/113 |
| 7,870,491 B1 * | 1/2011 | Henderson et al. | ............ | 715/745 |
| 2004/0255270 A1 * | 12/2004 | McGlinchey et al. | ........ | 717/109 |
| 2006/0184888 A1 * | 8/2006 | Bala | ............................... | 715/762 |
| 2006/0236236 A1 * | 10/2006 | Wilbrink et al. | ............... | 715/530 |
| 2009/0132920 A1 * | 5/2009 | Deyo et al. | ..................... | 715/708 |

* cited by examiner

*Primary Examiner* — William Bashore
*Assistant Examiner* — Hien Duong
(74) *Attorney, Agent, or Firm* — Osha Liang LLP

(57) ABSTRACT

A method for video sharing between users of an application. The method involves generating a textual based document. Generating the textual based document includes, for each action performed by the assisting user using the application, detecting the action, identifying an action identifier uniquely identifying the action, and storing a step that includes the action identifier in the textual based document. The method further includes receiving a help request from a perplexed user, obtaining the textual based document matching the help request, generating the support video from the textual based document. Generating the support video includes, for each step in the textual based document, obtaining the action identifier from the step in the textual based document, identifying an action for the perplexed user mapped to the action identifier, and rendering the action for the perplexed user into the support video. The method further includes presenting the support video to the perplexed user.

17 Claims, 13 Drawing Sheets

METHOD AND SYSTEM FOR VIDEO SHARING BETWEEN USERS OF AN APPLICATION

BACKGROUND

Finances can be complicated. Specifically, finances include managing various financial accounts (e.g., credit card accounts, checking accounts, savings accounts), managing different sources of income, having various financial obligations (e.g., obligations derived from healthcare and repayment of loans), planning for future events, preparing reports (e.g., tax return and other filings), etc. In efforts to simplify finances, users may use a financial application. Specifically, financial applications organize and simplify financial landscape of an individual or organization.

On occasion, a user of a financial application requires assistance to use the financial application. When a user requires assistance, the user may contact support personnel, such as by telephone, email, or chat, and/or may use documents, such as help files and tutorials, generated by the vendor of the financial application or professional tutors of the financial application. In addition to documents, the user may access a forum for the financial application. A forum is a virtual location that allows different users to communicate about a topic. Specifically, the forum provides a communication link between users. Thus, using the forum, users may share experiences with the financial application and assist each other.

In general, when a user wants to discuss a topic in the forum, the user creates a discussion thread by posting a question on the forum. Other users perusing the forum may provide a response to the question by posting comments or answers, in text, to the discussion thread. Thus, the user that posts the question is able to receive an answer to the user's exact question. Moreover, other users who have the same question may view the discussion thread to view the answers and comments provided by the community. As shown, the forum allows users to provide guidance to other users.

SUMMARY

In general, in one aspect, the invention relates to a method for video sharing between users of an application. The method includes receiving, from an assisting user, a start video command to create a support video of the assisting user using the application, and generating a textual based document based on the start video command. Generating the textual based document includes, for each action of a plurality of actions performed by the assisting user using the application, detecting the action performed by the assisting user, identifying an action identifier uniquely identifying the action performed by the assisting user, and storing a step that includes the action identifier in the textual based document. The method further includes receiving a help request from a perplexed user, obtaining the textual based document matching the help request, generating the support video from the textual based document. Generating the support video includes, for each step in the textual based document, obtaining the action identifier from the step in the textual based document, identifying an action for the perplexed user mapped to the action identifier, and rendering the action for the perplexed user into the support video. The method further includes presenting the support video to the perplexed user.

In general, in one aspect, the invention relates to a system for video sharing between users of an application that includes a processor, a data repository that includes a textual based document, and a support video access system executing on the processor and connected to the data repository. The textual based document is generated by, for each action of a plurality of actions performed by an assisting user using the application, detecting the action performed by the assisting user, identifying an action identifier uniquely identifying the action performed by the assisting user, and storing a step that includes the action identifier in the textual based document. The support video access system is configured to receive a help request from a perplexed user, obtain the textual based document matching the help request from the data repository, and generate the support video from the textual based document. Generating the support video includes, for each step in the textual based document, obtaining the action identifier from the step in the textual based document, identifying an action for the perplexed user mapped to the action identifier, and rendering the action for the perplexed user into the support video. The support video access system is further configured to present the support video to the perplexed user.

In general, in one aspect, the invention relates to a computer readable medium that includes computer readable program code embodied therein. The computer readable program codes causes a computer system to receive a start video command from an assisting user to create a support video of the assisting user using a application, and generate a textual based document based on the start video command. Generating the textual based document includes, for each action of a plurality of actions performed by the assisting user using the application, detecting the action performed by the assisting user, identifying an action identifier uniquely identifying the action performed by the assisting user, and storing the action identifier in the textual based document. The computer readable program codes further causes the computer system to receive a help request from a perplexed user, obtain the textual based document matching the help request, generate the support video from the textual based document. Generating the support video includes obtaining the action identifier from the textual based document, identifying an action for the perplexed user mapped to the action identifier, and rendering the action for the perplexed user into the support video. The computer readable program codes further causes the computer system to present the support video to the perplexed user.

Other aspects of the invention will be apparent from the following description and the appended claims.

DETAILED DESCRIPTION

Figure 1:
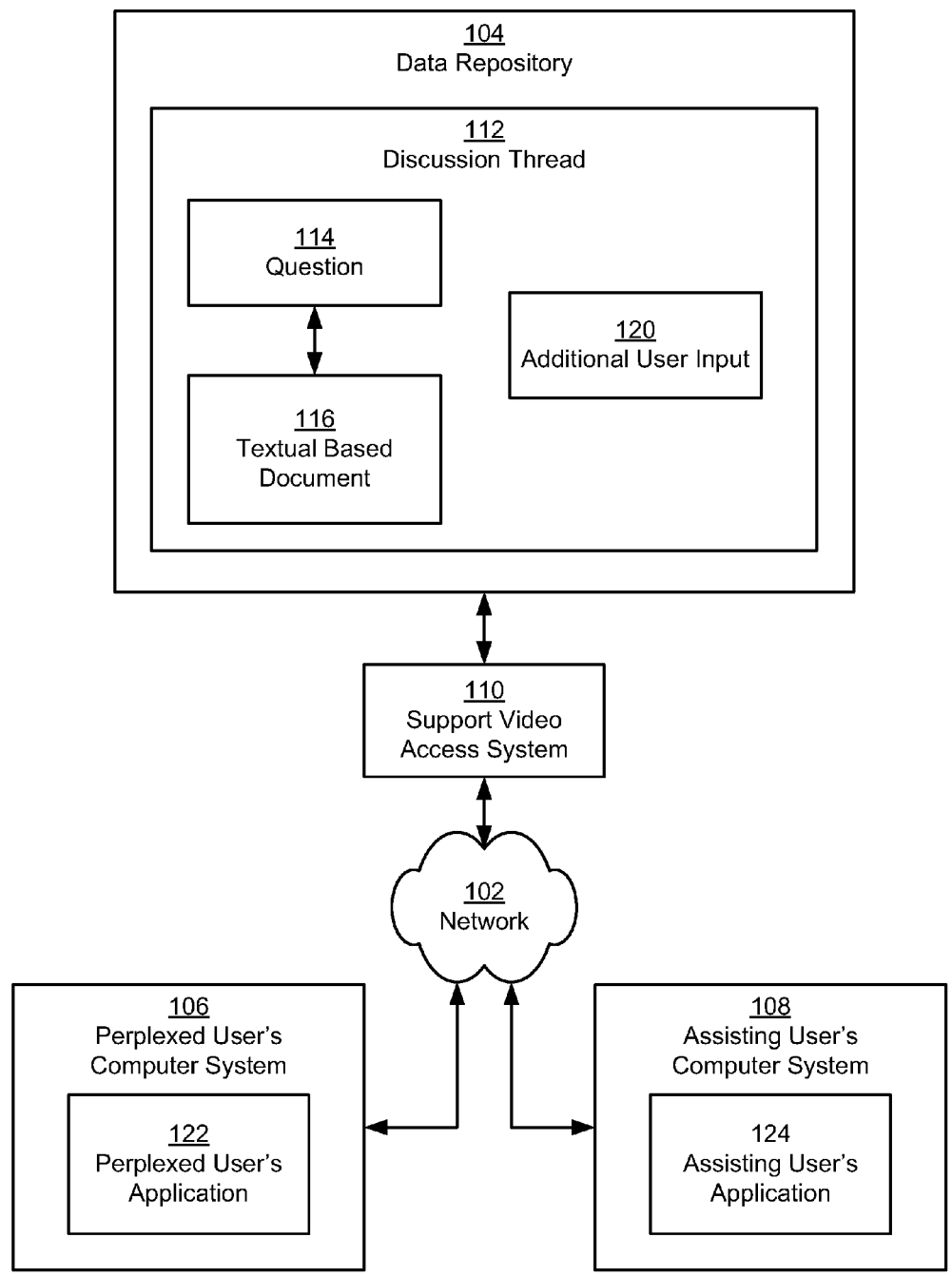
FIGS. 1 and 2 show schematic diagrams in accordance with one or more embodiments of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for video sharing between users of an application. Specifically, embodiments of the invention provide a mechanism for an assisting user to create a support video capturing actions performed by the assisting user while using the application. The support video may be retrieved and viewed by a perplexed user. Thus, the perplexed user can view the actions that the assisting user performed using the application. In one or more embodiments of the invention, the support video is stored as a textual based document. The textual based document stores a textual list of steps performed by the assisting user. The list of steps is rendered into the support video for the perplexed user.

The application is any type of software product used by users. For example, the application may be a word processing application, a media application, a spreadsheet application, a game, a financial application, or any other application. In one or more embodiments of the invention, a financial application is a software product that assists users in performing financially related tasks. For example, the financial application may include functionality to manage, maintain, and organize financial data for the user to perform accounting tasks, file tax returns, perform business related financial transactions (e.g., billing, payroll, credit card processing), and/or perform other financially related tasks.

In one or more embodiments of the invention, an assisting user is a user that provides the support video. In one or more embodiments of the invention, a user is an individual that accesses the help forum. The user may be a customer of the vendor that released the application. In one or more embodiments of the invention, the assisting user is an amateur (i.e., non-professional) support provider of guidance for the application. Specifically, the assisting user is not paid to provide the support to users. For example, the assisting user is not a professional tutor or paid support professional for the application. In such embodiments, the assisting user may be a professional accountant or in another type of profession that does not professionally provide technical support for the application.

Alternatively or additionally, the assisting user may be a professional support provider of the support video. In such alternative, the assisting user may be paid for services of providing support videos for perplexed users. For example, the assisting user may be technical support for the vendor of the financial application.

The perplexed user is a user that asks a question or presents a comment that triggers the assisting user to create the video. The perplexed user may also include the user that views the video. In one or more embodiments of the invention, more than one perplexed user may exist. For example, one perplexed user may ask a question and the same and/or other perplexed users may view the support video as a response to the question. In one or more embodiments of the invention, the perplexed user is a customer or potential customer of the vendor of the application.

Figure 2:
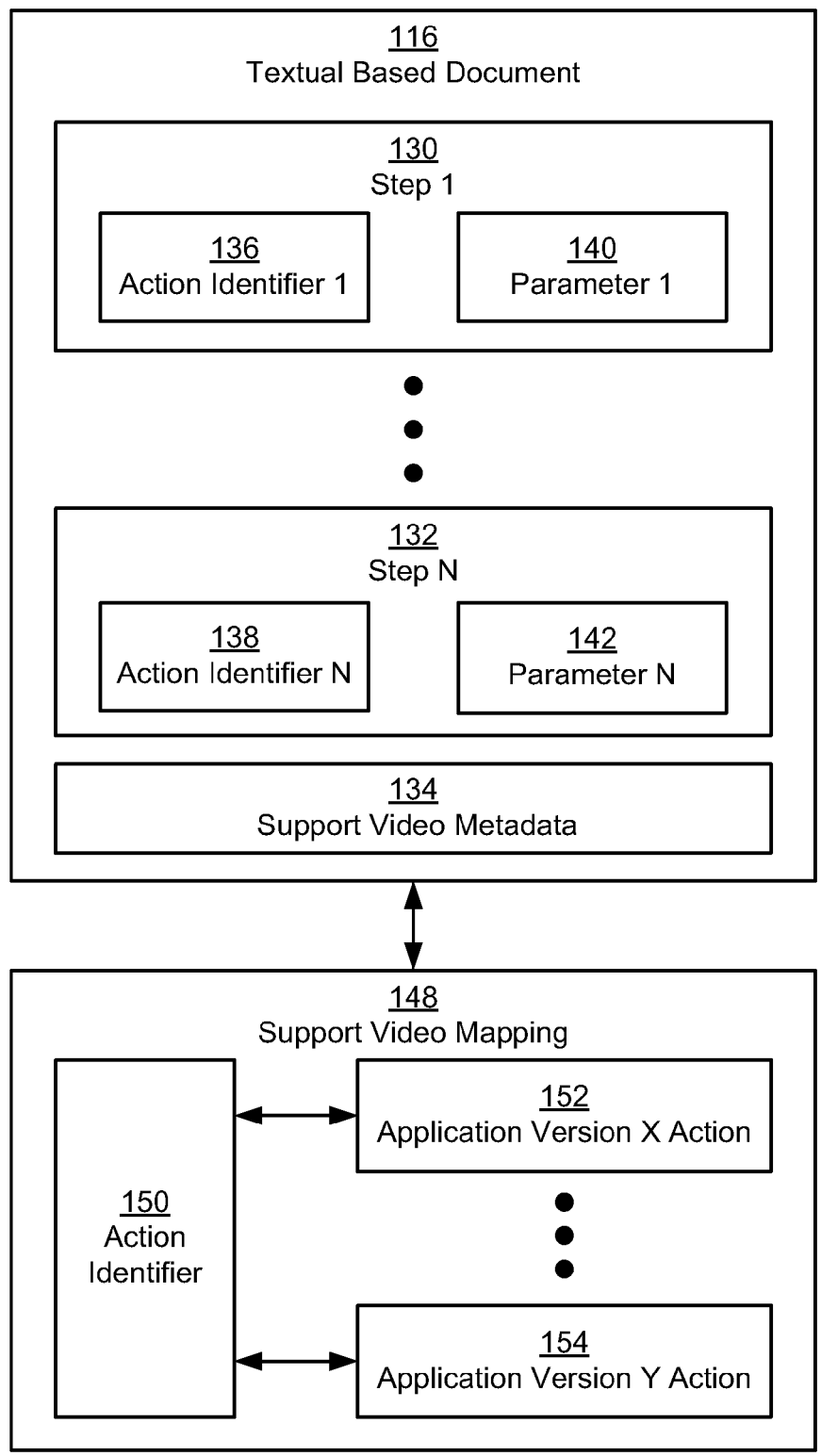

FIGS. 1 and 2 show schematic diagrams in accordance with one or more embodiments of the invention. As shown in FIG. 1, the system includes a network (102), a support video access system (110), a data repository (104), a perplexed user's computer system (106), and an assisting user's computer system (108). Each of these components is discussed below.

In one or more embodiments of the invention, a network (102) is an interconnection of devices that allows the devices to communicate. The network (102) may be a wide area network (e.g., the Internet), a local area network, any other type of network, or combination thereof. In one or more embodiments of the invention, the network (102) transmits data between the perplexed user's computer system (106), the support video access system (110), and the assisting user's computer system (108).

In one or more embodiments of the invention, the support video access system (110) includes functionality to manage the access and retrieval of support videos. For example, the support video access system (110) may perform identity authentication of users and determine whether the user is authorized to view or upload a support video or textual based document. In one or more embodiments of the invention, the support video access system (110) includes software and/or hardware. The software may include functionality to present a user interface to the user and/or an application programming interface to the user's application. In one or more embodiments of the invention, the hardware corresponds to a server, such as an application server, for executing the software. The hardware may execute additional applications besides those associated with the storage and retrieval of support videos.

For example, the support video access system (110) is a general purpose media sharing website, a help forum, or other organization of information. In one or more embodiments of the invention, a help forum is a message board whereby users posts messages for other users to review in accordance with one or more embodiments of the invention. In one or more embodiments of the invention, the message may be a support video, text, and other information. In one or more embodiments of the invention, the messages are viewable by all users of the help forum (110). Thus, the help forum (110) connects users of the application with each other. For example, one user (e.g., perplexed user, assisting user) may post a message to the help forum, which is later retrieved by another user (e.g., perplexed user, assisting user). In one or more embodiments of the invention, the help forum (110) is accessible via the Internet. Alternatively or additionally, the help forum (110) may be accessible via the user's application (e.g., perplexed user's application (122), assisting user's application (124)). For example, if the user's application is a financial application, then within a help menu option of the financial application may include a tool for accessing the help forum.

In one or more embodiments of the invention, the data repository (104) is a storage unit and/or device (e.g., a file system, database, collection of tables, or any other storage mechanism) for storing data. Further, the data repository (104) may include multiple different storage units and/or hardware devices. The multiple different storage units and/or hardware devices may or may not be of the same type or located at the same physical site. In one or more embodiments of the invention, the data repository (104), or a portion thereof, is secure. In one or more embodiments of the invention, if the data repository (104) is a file system or other organization of data, the data repository (104) is stored on a hardware device, such as a storage server.

In one or more embodiments of the invention, the data in the data repository (104) includes one or more discussion threads (112). In one or more embodiments of the invention, a discussion thread (112) is a grouping of related messages. Specifically, a discussion thread may be a series of messages about the particular topic. Users may respond to each other's messages by posting messages to the discussion thread. In one or more embodiments of the invention, a discussion thread may include a question (114), a textual based document (116) and additional user input (120).

In one or more embodiments of the invention, a question (114) is a request for information from a perplexed user. The question (114) may be a technical question (e.g., how to use the application), a financial question (e.g., how group financial data, what the legal requirements are for reporting finances, and other such questions), or any other question regarding the topic of the discussion thread (112). The question (114) may be an abnormal question. For example, the abnormal question may be about how to use the application in a manner not intended by the vendor of the application. For example, if the application is a financial application, the abnormal question may be specific to the user's financial condition about an issue that does not affect many users. Alternatively, the question (114) may be about an issue encountered by many users.

In one or more embodiments of the invention, the textual based document (116) is a text-based representation of the support video. In one or more embodiments of the invention, the support video provides a response to the question (114) and/or provides guidance for using the application. Specifically, the textual based document (116) is a text version of a support video. A representation of the support video may be displayed for the perplexed user. For example, a link to the download text document, a link to the support video, an initial screenshot of the support video corresponding to the text document, or using other types of user interface components. The textual based document (116) is discussed below and in FIG. 2.

In one or more embodiments of the invention, additional user input (120) may include comments about the textual based document (116), additional textual based documents (not shown) for additional support videos, additional questions, clarifications, and other messages. Further, the additional user input may include descriptive information about the support video, such as a title of the support video and a description of the support video. In one or more embodiments of the invention, the description of the support video is a brief synopsis and/or comments about the task that the assisting user performs when using the support video. Further, in one or more embodiments of the invention, the additional user input (120) may include links to other support videos. For example, a user or the help forum may link the support video to another support video.

In one or more embodiments of the invention, a perplexed user's computer system (106) and an assisting user's computer system (108) are connected to the network (102) to communicate via the support video access system (110). A computer system (e.g., perplexed user's computer system (106), assisting user's computer system (108)) is a computing device configured to process instructions. In one or more embodiments of the invention, the computer system is a hardware device. For example, the computer system may be a personal computer, a terminal computer, a laptop computer, a personal digital assistant, a smart phone, or other device that can access the network (102). Although not shown in FIG. 1, the perplexed user and the assisting user may have multiple computer systems. For example, the perplexed user may use one computer system to use the application (122) and another computer system to view support videos.

In one or more embodiments of the invention, the perplexed user's computer system (106) includes a perplexed user's application (122). Specifically, the perplexed user's application (122) is displayed on perplexed user's computer system (106). The perplexed user's application (122) may execute on a remote computer system or locally, on the perplexed user's computer system (106). In one or more embodiments of the invention, the user interface of perplexed user's application (122) may include a help option for the user to request help. A help subprogram (not shown) may include functionality to display a window or pane in a window of the application with information to guide the user in using the application. The help subprogram may include functionality to access the support video access system (110) and display information from the support video access system (110). Specifically, the help subprogram may provide an interface to the support video access system (110) in accordance with one or more embodiments of the invention. Through the interface to the support video access system, the perplexed user may search the data repository (104) and view messages in the discussion threads, such as the support video.

In one or more embodiments of the invention, the help subprogram may include functionality to identify a portion of the application being used by the perplexed user and search the data repository (104) for support videos related to the portion. For example, if the perplexed user is viewing a tax form in the application, the help subprogram may include functionality to identify which tax form is being viewed, and search the data repository (104) for support videos related to the particular tax form.

Continuing with FIG. 1, in one or more embodiments of the invention, the assisting user's computer system (108) includes an assisting user's application (124). In one or more embodiments of the invention, the assisting user's application (124) may be similar to the perplexed user's application (122). For example, the assisting user's application (124) may be the same or a different version of the perplexed user's application (122). Specifically, both user's may have the same application (e.g., the same tax application or the same other application) and have different versions of the same application. The versions may be different based on release date (e.g., one version may be a prior version than the other version), intended audience (e.g., one version may be for business use while another version is for personal use), the stock keeping unit (SKU) of the application (e.g., different editions of the same application providing different features), and where the version is executed (e.g., locally on a user's computer system or remote from the user's computer system). Other differences between the assisting user's application (124) and the perplexed user's application (122) may exist without departing from the scope of the invention.

In one or more embodiments of the invention, the perplexed user's application (122) and the assisting user's application (124) have different user interfaces. Specifically, each application (e.g., perplexed user's application (122), assisting user's application (124)) may have user interface components. The user interface components are the portions of the user interface that are displayed or can be displayed. Specifically, the user interface components correspond to the viewable aspects of the user interface. For example, user interface components may include title bars, text boxes, windows, buttons, menu bars, menu items, and other user interface components.

In one or more embodiments of the invention, the user interface component may be different for different versions of the application (e.g., perplexed user's application (122), assisting user's application (124)). For example, the user interface components may be in different position, accessed in different manner (e.g., through different menus), have different access points (e.g., require more or less steps), have different names, and/or be of different types. For example, the assisting user's application (124) may have a drop-down box to select from a list of items while the perplexed user's application (122) has radio buttons to perform the same selection from the same list of items. In one or more embodiments of the invention, when the support video is rendered for the perplexed user, the support video is rendered according to the user interface of the perplexed user's application (122). Specifically, the support video is rendered according to the user interface components of the perplexed user's application (122).

Although FIG. 1 shows only the network (102), the data repository (104), the perplexed user's computer system (106), and the assisting user's computer system (108), the system may include additional components without departing from the scope of the invention. For example, the system may include an application server (not shown) connected to the data repository (104). The application server may include functionality to retrieve data from the data repository (104) and send the data to the user's computer systems (e.g., perplexed user's computer system (106), assisting user's computer system (108)).

Although FIG. 1 shows a system whereby support videos are transferred via the network, the support video may be transferred via a non-network storage device. For example, the textual based document (116) may be transferred between the perplexed user's computer system (106) and the assisting user's computer system (108) via a flash drive. In such embodiments, the support video access system (110) may be hardware for transferring the textual based document (116) from the storage device.

FIG. 2 shows a schematic diagram of the textual based document (116) in accordance with one or more embodiments of the invention. As shown in FIG. 2, the textual based document (116) includes steps (e.g., step 1 (130), step n (132)) and support video metadata (134). In one or more embodiments of the invention, the steps are ordered in accordance with the order performed by the assisting user. Each step (e.g., step 1 (130), step n (132)) corresponds to an action performed by the assisting user in accordance with one or more embodiments of the invention.

In one or more embodiments of the invention, an action is a submission of information or selection of data. For example, the action may be the selection of a menu item from a menu (e.g., selection of a radio button, selecting from a drop down menu, selecting an option from the menu bar or a submenu item), the selection of a button (e.g., submit button, accept button, etc.), the submission of data (e.g., entering a name or category of a transaction, adding a label, and other such submissions), and other such actions. In one or more embodiments of the invention, the actions stored by the textual based document (116) exclude the moving of a mouse or a cursor, such as from one position on the user interface to another position on the user interface.

In one or more embodiments of the invention, the steps (e.g., step 1 (130), step n (132)) include an action identifier (e.g., action identifier 1 (136), action identifier n (138)) and a parameter (e.g., parameter 1 (140), parameter n (142)). Each of these components of the steps is discussed below.

In one or more embodiments of the invention, the action identifier (e.g., action identifier 1 (136), action identifier n (138)) provides a unique identifier for the action. For example, the action identifier may be an identifier of the user interface component in which the user submits data, an identifier of the user interface component selected, etc. In one or more embodiments of the invention, the identifier is a name, a numeric identifier, or an alphanumeric identifier. Thus, rather than storing a series of screen images representing each movement of the mouse, an action identifier corresponding to the action is stored.

In one or more embodiments of the invention, the parameter (e.g., parameter 1 (140), parameter n (142)) identifies additional input about the action. For example, the parameter may include text submitted by a user in the text box, an identifier of the menu item selected, and other such information. In one or more embodiments of the invention, some steps may be stored without a parameter. For example, if the user is selecting an "accept" button (e.g., to accept a contract), then the step corresponding to the selection of the accept button may not include a parameter.

For the following example, consider the scenario in which the assisting user applies the travel category to a financial transaction then saves the assisting user's change. When the assisting user performs the above actions, the assisting user may perform the following: move the mouse from an initial position on the screen to a position covering the category identifier; select the travel category; move the mouse from the position covering the mouse category to a position over the file menu; select the file menu; move the mouse to the save button in the file menu; and select the save button.

In the example, the textual based document for the above action includes two steps in accordance with one or more embodiments of the invention. The first step may correspond to the selection of the travel category. The second step may correspond to the saving of a file. For the first step, the action identifier may include an identifier of the financial transaction and an identifier for the category field. The parameter may identify "travel." For the second step, the action identifier may include an identifier for the file menu, and the parameter may correspond to the save option in the file menu. Alternatively, the action identifier may correspond to the save option in the file menu. As shown in the example, in one or more embodiments of the invention, the steps in the textual based document (116) are the minimal listing of steps to define the actions performed by the assisting user.

In one or more embodiments of the invention, the textual based document (116) includes support video metadata (134). In one or more embodiments of the invention, the support video metadata (134) includes information describing the support video, such as an identifier of the assisting user, a date and time of the support video, an identifier of the discussion thread, keywords extracted from the support video or information about the subject of the support video, one or more identifiers of the version of application, year in which the version of the application was release, and other information. The keywords may be derived from the title of the support video (discussed above), description of the support video (discussed above), the graphical user interface components used in creating the support video, and/or from other sources describing the support video.

In one or more embodiments of the invention, as shown in FIG. 2, the textual based document (116) is connected to a support video mapping (148). In one or more embodiments of the invention, the support video mapping (148) provides a mapping between each possible action identifier (150) and actions (e.g., application—version X action (152), application—version Y action (154)). For example, the support video mapping (148) correspond to a universal translation table that maps actions for different versions of the application. Other data structures may be used to store the support video mapping without departing from the scope of the invention. Thus, each action identifier (e.g., action identifier 1 (136), action identifier n (138)) in the textual based document (116) is listed in the support video mapping (148) in accordance with one or more embodiments of the invention.

In one or more embodiments of the invention, the action identifiers are common across different versions of the application. Thus, the same action identifier (150) may be used to define the action for the version of the application used by the assisting user and the version of the application used by the perplexed user.

In one or more embodiments of the invention, the action (e.g., application—version X action (152), application—version Y action (154)) defines how the step should be displayed based on the which version of the application that the user, who is viewing the support video, is using. The action (e.g., application—version X action (152), application—version Y action (154)) may be stored in memory as instructions, such as in a program's subroutine. For example, the action may be to select a specific graphical user interface component, submit data, etc.

Alternatively, rather than using action identifiers that are universal to different versions of the application, the action identifiers may be specific to the assisting user's version of the application. In such embodiments, the support video mapping may map the action identifiers as defined by the assisting user's version of the application with the corresponding actions for the perplexed user's version of the application. The mapping may contain a mapping for each combination of versions of the application.

In one or more embodiments of the invention, the same action identifier may map to a series of actions. Specifically, a single step in one version of the application may correspond to multiple steps in another version of the application. In such a scenario, the multiple steps correspond to the series of actions. Although not shown in FIG. 2, the textual based document (116) may be associated with one or more audio files. The audio files may be provided, for example, by the assisting user. In particular, while the assisting user is creating or editing the support video, the assisting user may describe the actions the user performed or is performing using an input device, such as a microphone. Alternatively, the audio files may be provided by the application. Specifically, each possible action performed by the assisting user may have a corresponding audio file that describes the action. Further, each step may include a corresponding text note. A text note may be a description or comment by the assisting user about the step.

Figure 3:
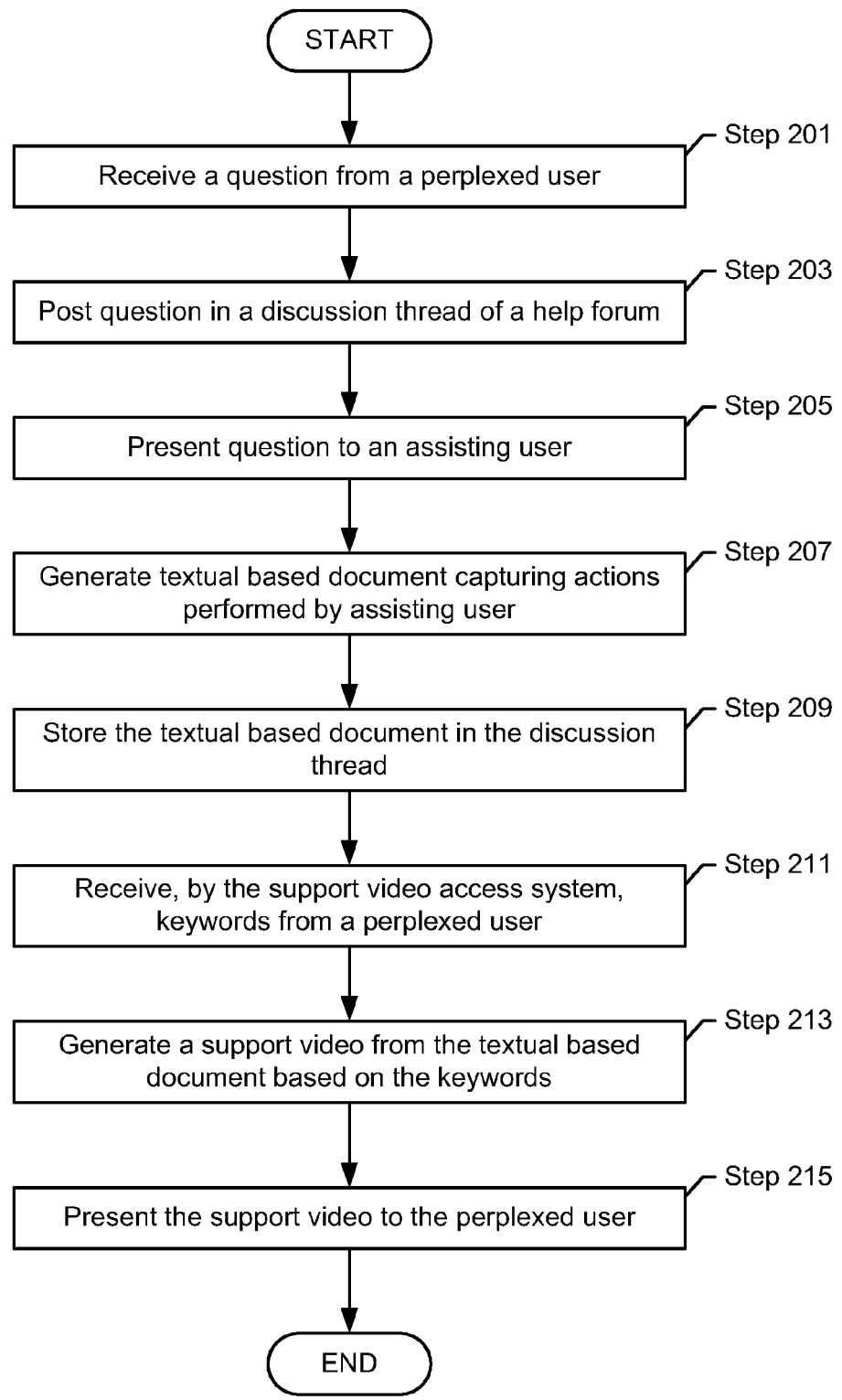
FIGS. 3-5 show flowcharts in accordance with one or more embodiments of the invention.
Figure 4:
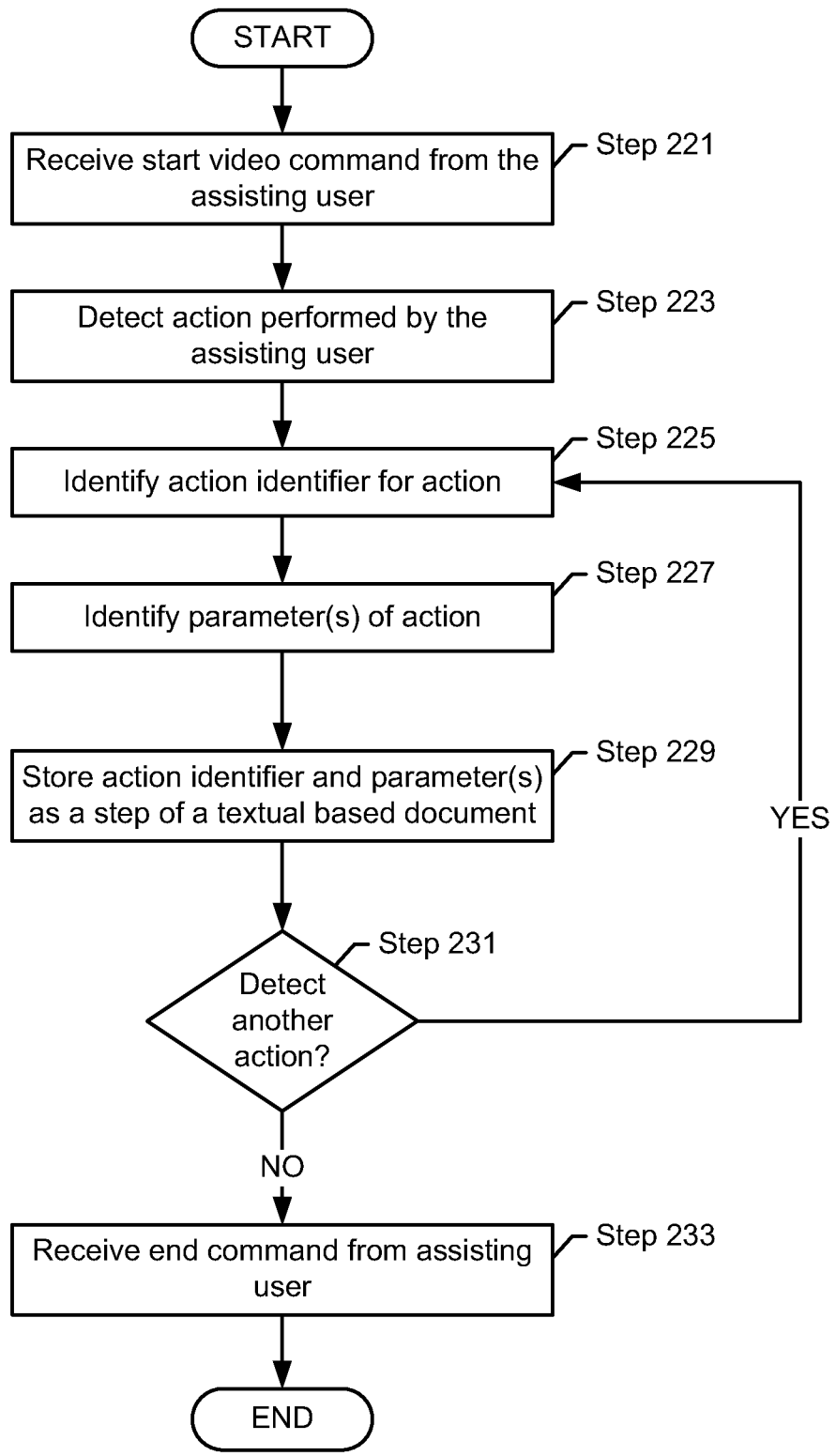
Figure 5:
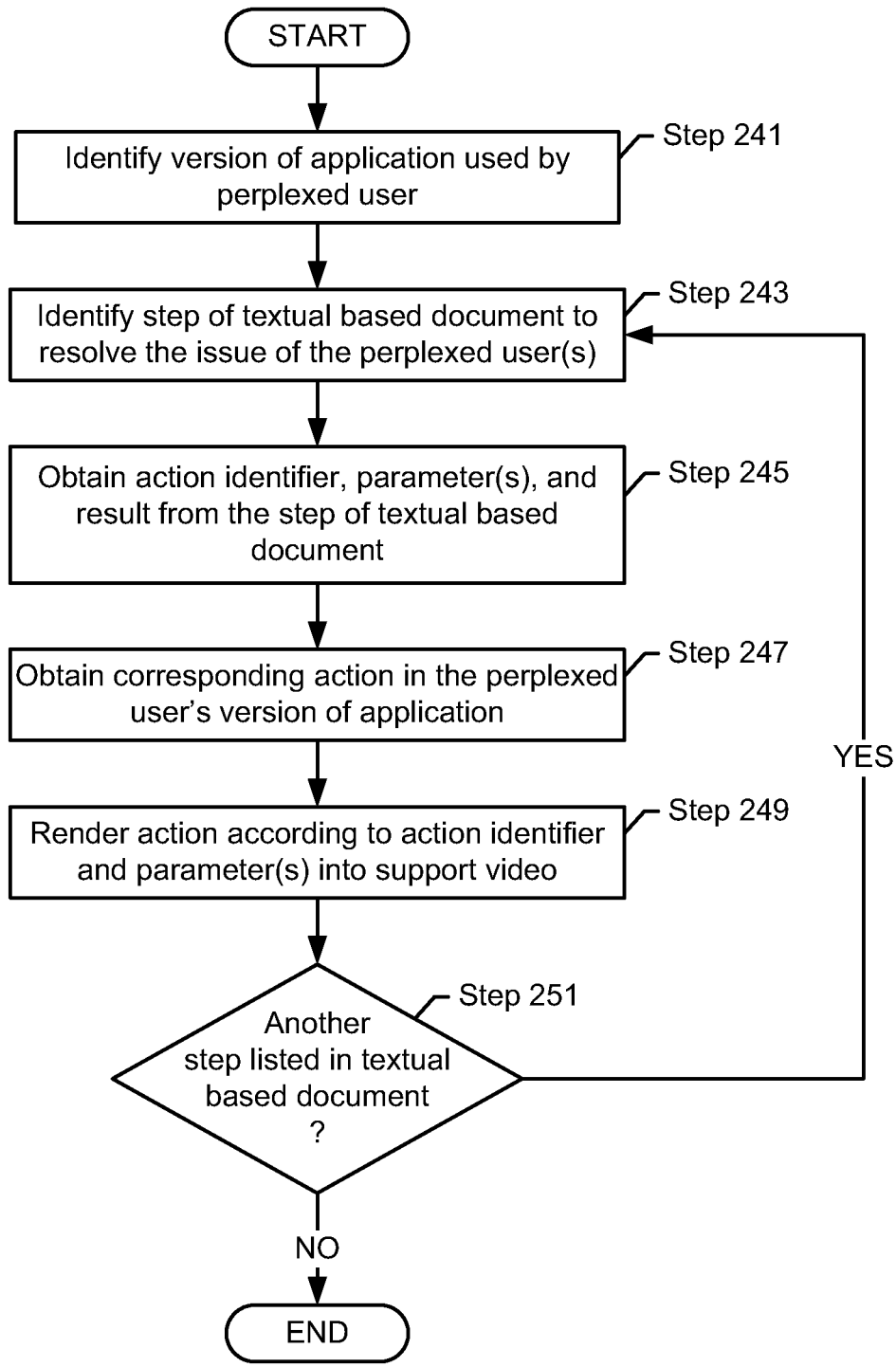

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

Further, the steps described below may be performed by different components of the system discussed above. For example, the textual based document may be transferred from the support video access system in text format and rendered into video format by the user's application for display to the user. As an alternative example, the support video may be rendered by the support video access system and then transferred in video format to the user's computer system for display to the user.

FIG. 3 shows a flowchart for video sharing between users of an application in accordance with one or more embodiments of the invention. Different reasons may instigate the creation of a support video. For example, the assisting user may create the support video to answer another user's question. Alternatively, the assisting user may discover a new feature of the application and want to share the new feature. In another example, the assisting user may be a professional support provider that wants to highlight a feature of the financial application. Steps 201-205, discussed below may be performed, for example, when a question of the perplexed user instigates the creation of the support video.

In Step 201, a question is received from a perplexed user in accordance with one or more embodiments of the invention. For example, the perplexed user may post the question as a text question to the discussion thread. Alternatively, the perplexed user may create an inquiry video. The inquiry video may capture actions performed by the perplexed user while the perplexed user is using the application. The inquiry video may be used to demonstrate the problem that the perplexed user is encountering using the application. In one or more embodiments of the invention, creating the inquiry video may be performed similarly to the technique described in FIG. 4 regarding creating a support video by the assisting user.

For the following example, consider the scenario in which the support video access system includes a help forum. While using the application, the perplexed user may have an unresolved issue. The perplexed user may search through the various help documents and still not find resolution. Accordingly, the perplexed user may query the community of customers of the application to determine whether someone in the community has figured out a solution to the issue. The perplexed user may search the help forum. If the perplexed user does not find a discussion thread matching the problem, then the perplexed user may start a new discussion thread. Alternatively, if the perplexed user does find a discussion thread, then the perplexed user may determine whether all the discussion thread provides enough detail to solve the perplexed user's issue.

Regardless of whether the perplexed user starts a new discussion thread or posts to an existing discussion thread, the perplexed user submits a question in accordance with one or more embodiments of the invention. In one or more embodiments of the invention, in Step 203, the question is posted to the discussion thread. After posting the question, the question becomes visible to other users of the support video access system.

In Step 205, the question is presented to the assisting user in accordance with one or more embodiments of the invention. Specifically, one of the users that may view the question is the assisting user. The assisting user may be perusing the support video access system and recognize the question as a question to which the assisting user can provide an answer. Accordingly, the assisting user may respond to the question by providing a support video.

As discussed above an alternative to responding to a question, the assisting user may simply create the support video to provide information. In such a scenario, the assisting user may start a new discussion thread with the support video in accordance with one or more embodiments of the invention.

In Step 207, a textual based document capturing the actions performed by the assisting user is generated in accordance with one or more embodiments of the invention. Specifically, using the assisting user's computer system, the assisting user performs the actions in the application that are required to solve the question. The application tracks the actions performed by the assisting user and generates a textual based document to capture the actions. FIG. 4 shows a flowchart for generating a textual based document capturing actions performed by the assisting user in accordance with one or more embodiments of the invention.

Continuing with FIG. 3, in Step 209, the textual based document is stored with the discussion thread. Specifically, the textual based document may be stored in a data repository and associated with the discussion thread. In one or more embodiments of the invention, the textual based document appears as a link to the support video. In alternative embodiments of the invention, a screen shot of one of the screens of the support video may be displayed in the discussion thread. Buttons such as, a start button, a stop button, a proceed slowly through the steps button, a fast forward button, buttons to skip to specific steps, and a rewind button may also be displayed with the textual based document in accordance with one or more embodiments of the invention. In one or more embodiments of the invention, the textual based document is displayed with descriptive information about the support video.

In Step 211, the support video access system receives keywords from a perplexed user in accordance with one or more embodiments of the invention. The perplexed user from which the support video access system receives the keywords may be the same perplexed user that submitted the question or a different perplexed user.

In one or more embodiments of the invention, the user may submit the keywords (e.g., by using an internet browser, using the help menu in the application, etc.), or the help subprogram of the application may extract keywords based on the window being viewed by the perplexed user. In one or more embodiments of the invention, the user submits the keywords in the form of a question to a help forum. In one or more embodiments of the invention, the support video access system performs a keyword search to identify discussion threads matching the keywords. Specifically, the support video access system may attempt to match keywords submitted by the perplexed user with keywords in the discussion threads and in the descriptive information about the textual based documents. When a match is found, than the support video may display user interface component that allows the perplexed user to view the support video. For example, the user interface component may be a link to the support video or a screenshot of the support video. The perplexed user may select the link or a play button to play the support video. Alternatively, the support video may be automatically played for the perplexed user. Prior to playing the support video, the support video is generated.

In Step 213, a support video is generated from the textual based document based on the keywords in accordance with one or more embodiments of the invention. FIG. 5 shows a flowchart for generating a support video from the textual based document in accordance with one or more embodiments of the invention.

Continuing with FIG. 3, in Step 215, the support video is presented to the perplexed user in accordance with one or more embodiments of the invention. Specifically, the support video may be displayed for the perplexed user. The support video may be displayed, for example, in the user interface of the application or in an Internet browser. Further, the support video may be displayed with a textual listing of the steps in the textual based document. In one or more embodiments of the invention, the support video is displayed with the textual listing when the perplexed user and the assisting user use the same version of the application. The textual listing of steps may be printed on paper, displayed on a monitor, or otherwise displayed for the user.

FIG. 4 shows a flowchart for generating a textual based document capturing actions performed by the assisting user in accordance with one or more embodiments of the invention. In Step 221, a start video command is received from the assisting user in accordance with one or more embodiments of the invention. In one or more embodiments of the invention, within the user interface of the assisting user's application is a start button to start generating a support video. By selecting the start button, the assisting user indicates to the application to start recording the actions performed by the assisting user.

In Step 223, an action performed by the assisting user is detected in accordance with one or more embodiments of the invention. Specifically, after receiving the start video command, the application identifies which action is performed by the assisting user. Techniques known in the art may be used for the application to identify the actions performed by the assisting user.

In Step 225, an action identifier for the action is identified in accordance with one or more embodiments of the invention. In one or more embodiments of the invention, each action that the user performs has a corresponding action identifier with the action. For example, in the instructions of each graphical user interface component of the application may include the action identifier corresponding to the graphical user interface component. Accordingly, the action identifier may be obtained from the graphical user interface component.

In Step 227, the parameter(s) of the action are identified in accordance with one or more embodiments of the invention. In one or more embodiments of the invention, the parameter(s) correspond to the parameters of the graphical user interface component. In one or more embodiments of the invention, the assisting user may specify which parameters to store. For example, the assisting user may specify that certain user-defined data should not be stored as parameters in the support video. The assisting user may be exclusive or inclusive in specifying the data. Specifically, the assisting user may select the data that should be stored as parameters in the textual based document or select the data that should not be stored as parameters in the textual based document. The selection may be performed using a graphical user interface component. For example, when the assisting user submits the start video command, the assisting user may select an option to define the type of data to store as parameters in the support video. Alternatively, the assisting user may select a graphical user interface component next to the data to define whether to store the data as a parameter. The assisting user may also perform the selection after completing the creation of the textual based document in accordance with one or more embodiments of the invention.

For the following example, consider the scenario in which the user selects the submit button. In one or more embodiments of the invention, within the instructions for the submit button may include an action identifier, and the action that the application is to perform. The instructions may further be associated with identifiers of one or more text boxes associated with the submit button. Accordingly, the action identifier and the action may be obtained from the instructions while the parameters may be obtained from the user-entered data in the text boxes.

Continuing with FIG. 4, in Step 229, the action identifier, and parameter(s) are stored as a step of the textual based document in accordance with one or more embodiments of the invention. Specifically, a new step is added to the textual based document. The new step includes the action identifier, the parameters, and the result.

In Step 231, a determination is made whether another action is detected in accordance with one or more embodiments of the invention. Specifically, a determination is made whether the assisting user selects another action to perform in accordance with one or more embodiments of the invention.

If another action is detected, then the method may repeat with Step 225 to identify and store the action in the textual based document in accordance with one or more embodiments of the invention.

In Step 233, if another action is not detected, an end command may be received from the assisting user in accordance with one or more embodiments of the invention. For example, the assisting user may select a stop button and upload button to upload the textual based document into the discussion thread. After the end command is received, the application connects to the help forum via the network and sends the textual based document to the help forum. Thus, the textual based document may be viewed by other customers, such as the perplexed user.

FIG. 5 shows a flowchart for generating a support video from the textual based document in accordance with one or more embodiments of the invention. In Step 241, the version of the application used by the perplexed user is identified in accordance with one or more embodiments of the invention. In one or more embodiments of the invention, the support video mapping for the perplexed user's application is identified. As discussed above, the support video mapping provides a translation between the action identified and the actions to be displayed for the perplexed user according to the perplexed user's version of the application. Thus, even when the perplexed user has a different version of the application than the assisting user, the support video is displayed according to the perplexed user's version in accordance with one or more embodiments of the invention.

In Step 243, a step of the textual based document to resolve the issue of the perplexed user is identified in accordance with one or more embodiments of the invention. In one or more embodiments of the invention, the first step identified is the first step listed in the textual based document. In Step 245, the action identifier and parameter(s) are obtained from the step of the textual based document in accordance with one or more embodiments of the invention.

In Step 247, the corresponding action in the perplexed user's version of the application is obtained in accordance with one or more embodiments of the invention. Specifically, the action identifier is used to identify the action in accordance with one or more embodiments of the invention.

In Step 249, the action is rendered into the support video according to the action identifier and parameter(s) in accordance with one or more embodiments of the invention. Rendering the action may include moving mouse pointer displayed from one location of the application to another location (e.g., covering the graphical user interface component used in the action). In one or more embodiments of the invention, the mouse pointer is rendered as moving from a previous location in the shortest path to the next location. For example, the previous position may correspond to the previous step, or to a default location (e.g., center of financial application, corner of the application, etc.) Further, a trailing line may be displayed on the path of the mouse pointer to show the movement of the mouse pointer in accordance with one or more embodiments of the invention.

Further, rendering the action may include performing instructions from the action. For example, if the action states to select a specific graphical user interface component, then the mouse pointer may be displayed over the graphical user interface component to be selected. Then, the graphical user interface component is selected. As another example, if the action is to input data, then each character of the data is displayed in a manner similar to the user typing in the data in accordance with one or more embodiments of the invention. The result of performing the step is displayed for the user.

In Step 251, a determination is made whether another step exists in the textual based document in accordance with one or more embodiments of the invention. If another step exists, then the method may repeat for the next step in accordance with one or more embodiments of the invention. In one or more embodiments of the invention, support video pauses at the rendering of each step. In such embodiments, the perplexed user may request, when the perplexed user is ready, to display the next step of the support video. Alternatively, the support video may not pause to wait for the perplexed user to request the display of the next step. Specifically, the support video may render the steps in the video continuously or only pause when a pause command from the perplexed user.

The following examples are for explanatory purposes only and not intended to limit the scope of the invention. Example FIGS. 6A-6G show an example in accordance with one or more embodiments of the invention. In the example illustrated in example FIGS. 6A-6G, consider the scenario in which Pete, a perplexed user, is trying to find out how to write a check using Version 2009 of a financial application ("Version 2009"). Alex, the assisting user, created a support video using Version 2003 of the financial application ("Version 2003") for writing the check. In the example, to create the video, Alex selected a start support video command in the help menu of Version 2003.

Figure 6A:
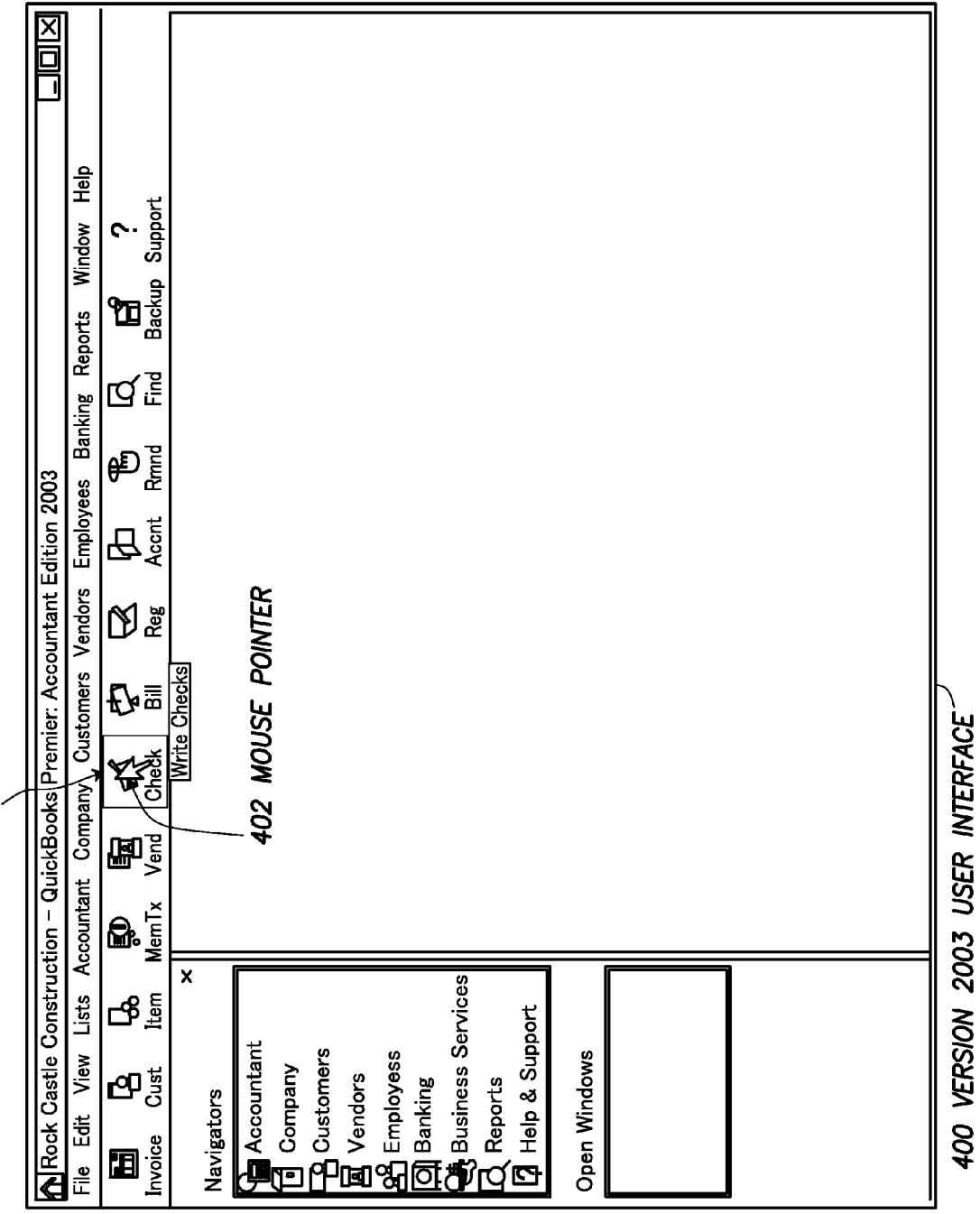
FIGS. 6A-6G shows an example in accordance with one or more embodiments of the invention.
Figure 6B:
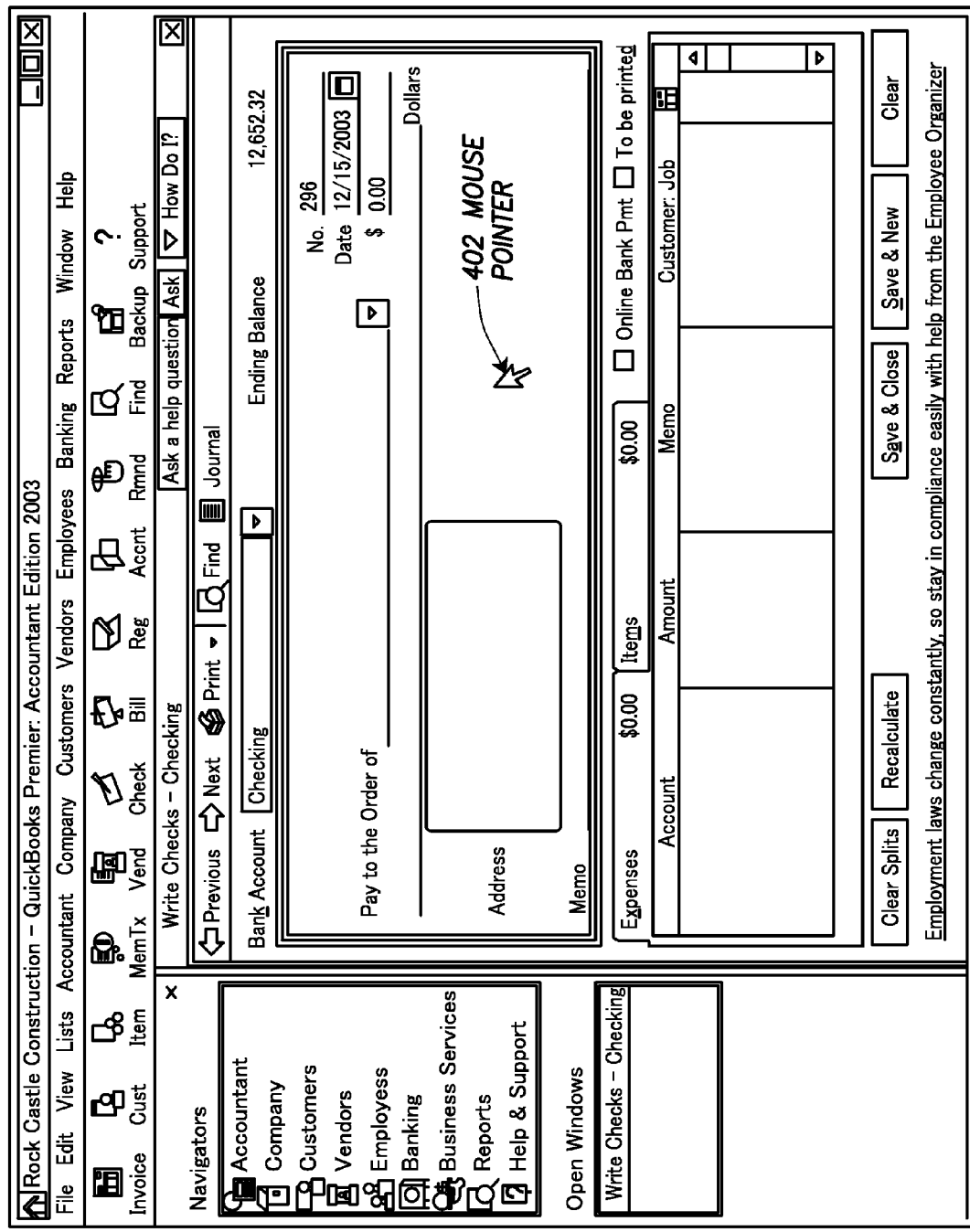
Figure 6C:
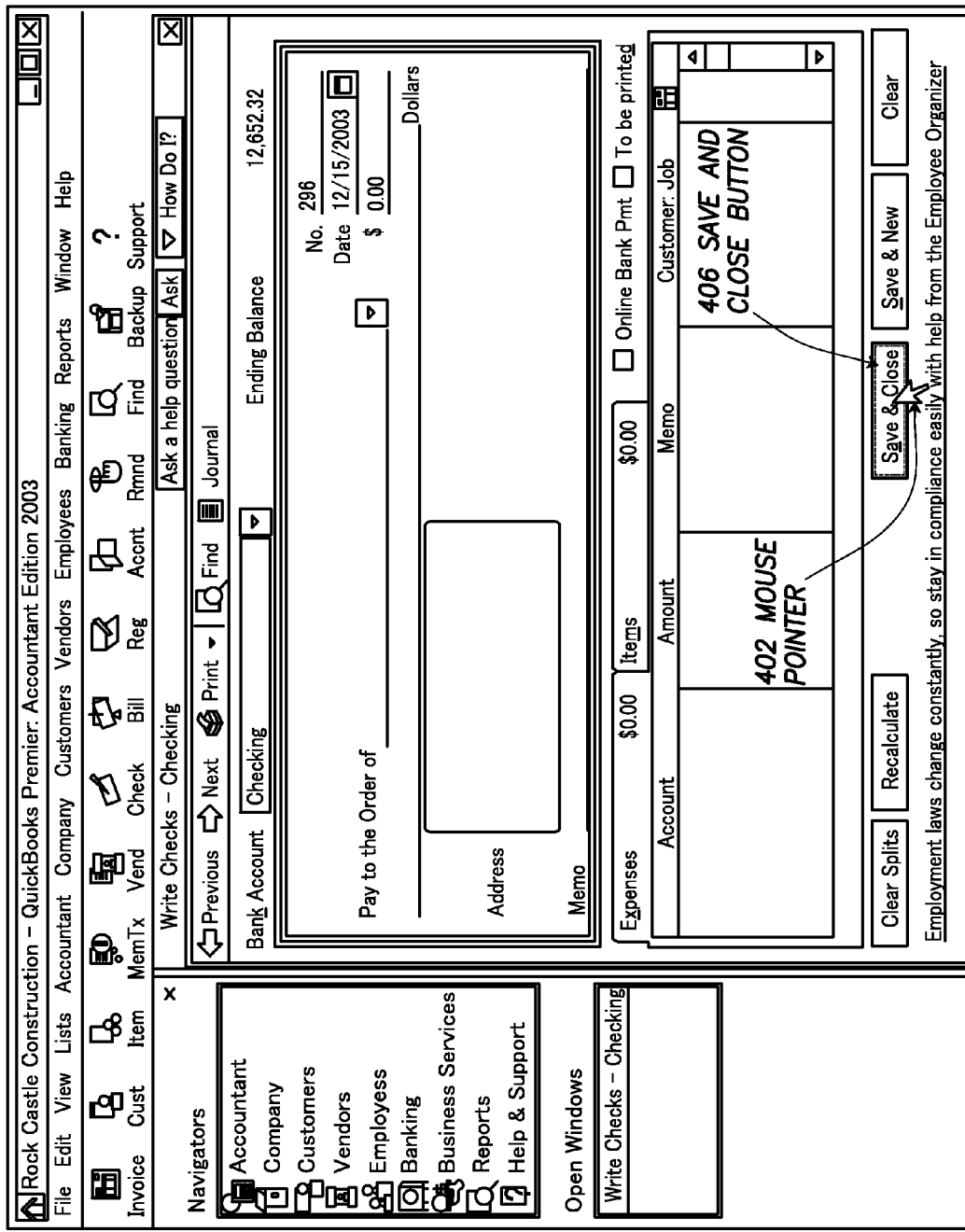

Example FIGS. 6A-6C shows Version 2003 user interface (400) when Alex uses the financial application to create the support video in accordance with one or more embodiments of the invention. As shown in example FIG. 6A, Alex moves the mouse pointer (402) to the check toolbar icon (404). Alex selects the check toolbar icon (404). The Version 2003 may record "select, Write Checks" as the action performed by Alex in the textual based document.

Example FIG. 6B shows the Version 2003 user interface (400) after Alex selects the check toolbar icon. As shown in FIG. 6B, the Version 2003 user interface (400) shows a check. Because only a check is displayed and Alex does not perform any action of selecting a graphical user interface component or submitting data, the Version 2003 may not record anything until Alex performs the next step.

Example FIG. 6C shows the Version 2003 user interface (400) when Alex performs the next step in accordance with one or more embodiments of the invention. As shown in example FIG. 6C, Alex moves the mouse pointer (402) to the save and close button (406). Alex selects the save and close button (406). The Version 2003 may record "select, save and close" as the action performed by Alex in the textual based document.

After Alex completes the actions for the support video, Alex selects a stop video command (not shown) in the help menu. Alex uploads the textual based document to a help forum devoted to the financial application. At this state, in one or more embodiments of the invention, the textual based document may include only two steps: 1. "select, Write Checks" and 2. "select, save and close" and may include metadata identifying it as created with Version 2003.

Continuing with the example, after Alex creates the support video, Pete searches the help forum using his internet browser. Specifically, Pete submits the question "write checks" to the help forum. One of the results shown to Pete is a link to the support video created by Alex. Pete selects the link to download the textual based document to his computer. The support video opens in the Version 2009 on Pete's computer.

Because the support video is created with Version 2003, Version 2009 obtains a translation table to map the steps listed in the textual based document to the Version 2009 actions.

Specifically, in the example, the translation table maps "select, Write Checks" to "select, Banking Menu" and "select, Write Checks Menu Option." In the example, the translation table, maps "select, save and close" to "select, save and close." Accordingly, for Version 2009, the support video renders 3 steps: 1. "select, Banking Menu," 2. "select, Write Checks Menu Option," and 3. "select, save and close."

Figure 6D:
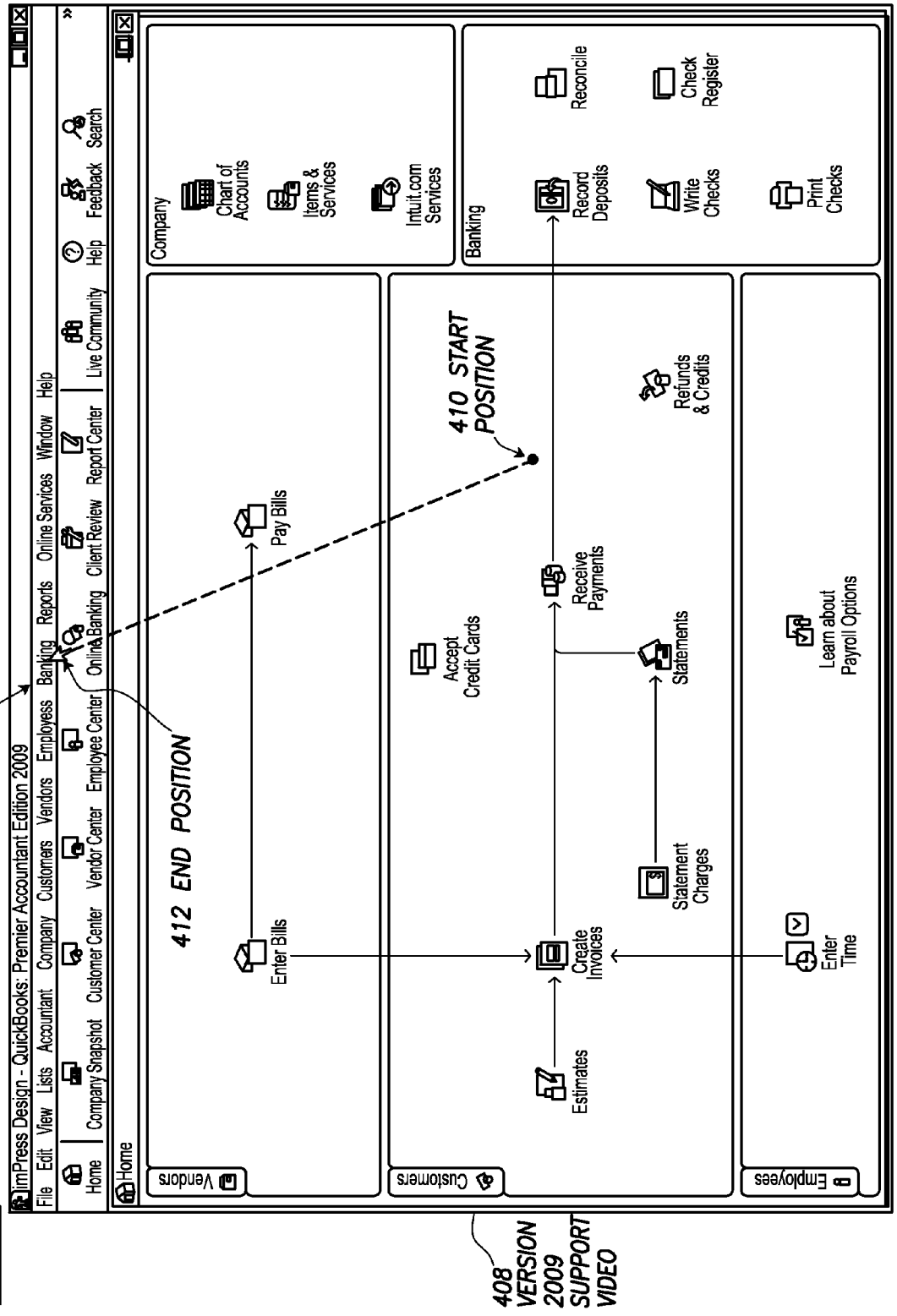

Example FIG. 6D shows an example Version 2009 user interface support video (408) that is displayed for Pete in accordance with one or more embodiments of the invention. As shown in example FIG. 6D, the example Version 2009 renders the step of "select, Banking Menu" by identifying the location of the banking menu (414) in accordance with one or more embodiments of the invention. Version 2009 support video displaying the mouse pointer moving from the start position (410) to the end position (414) over the location of the banking menu (414). Specifically, the action of the mouse moving is displayed for Pete in accordance with one or more embodiments of the invention. The Version 2009 support video may then show the selection of the banking menu (414) and the result (shown in FIG. 6E).

Figure 6E:
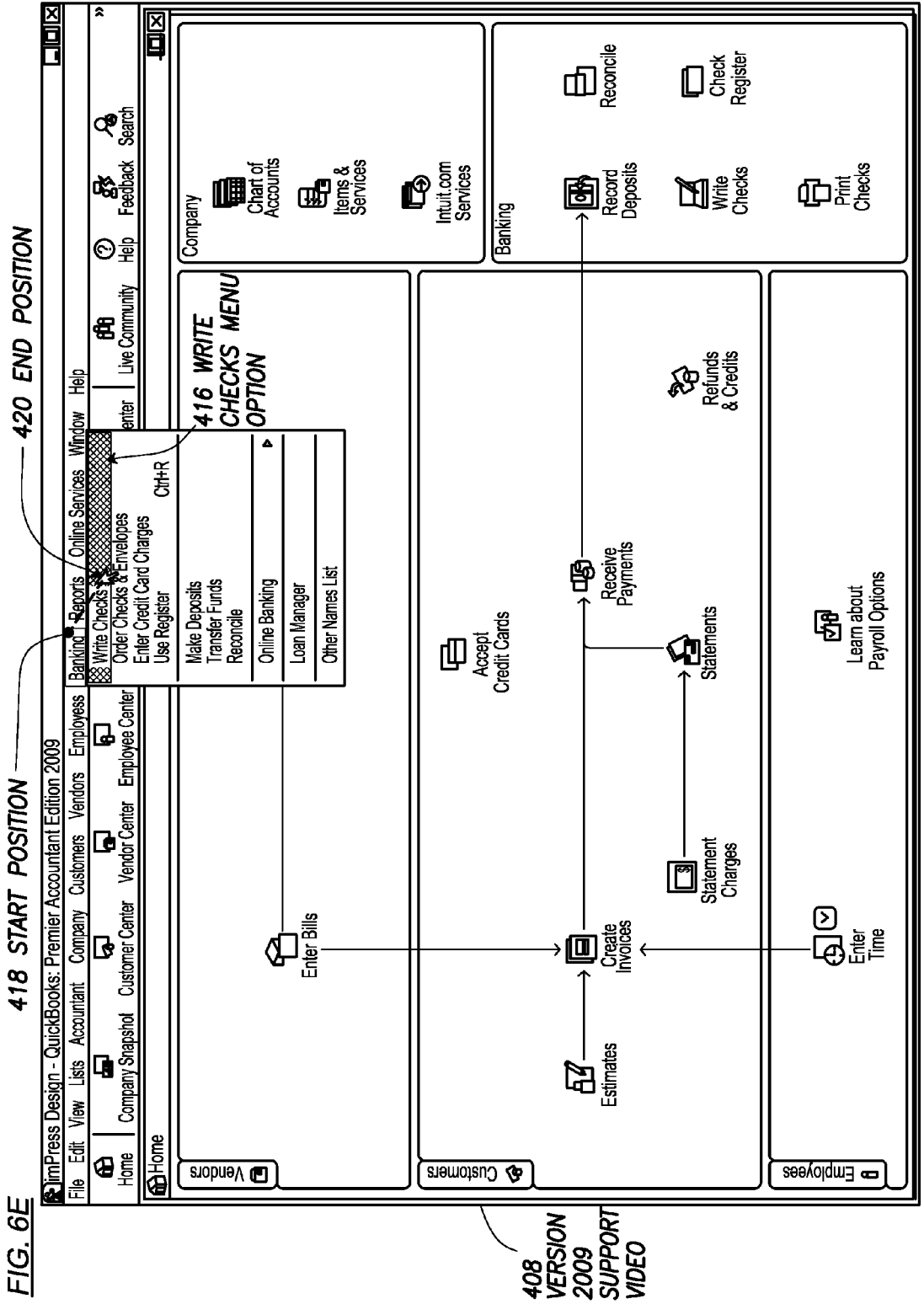
Figure 6F:
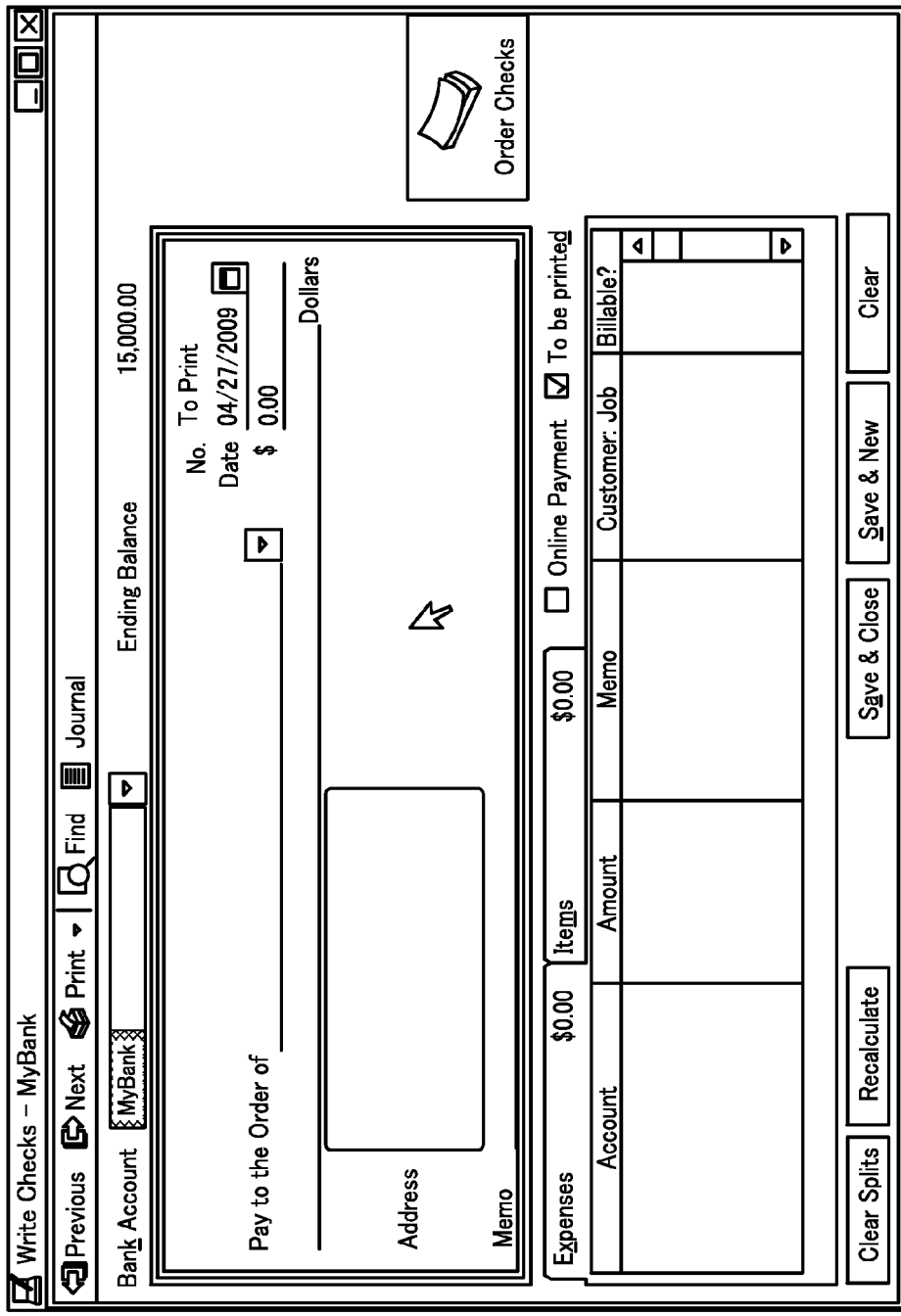

As shown in the example FIG. 6E, the Version 2009 renders the step of "select, Write Checks Menu Option" by identifying the location of the write checks menu option (416) in the banking menu in accordance with one or more embodiments of the invention. In one or more embodiments of the invention, Version 2009 support video displays the mouse pointer moving from the start position (418) to the end position (420) over the location of write checks menu option (416). The Version 2009 support video may then show the selection of the write checks menu option (416) and the result shown in example FIG. 6F in accordance with one or more embodiments of the invention.

Figure 6G:
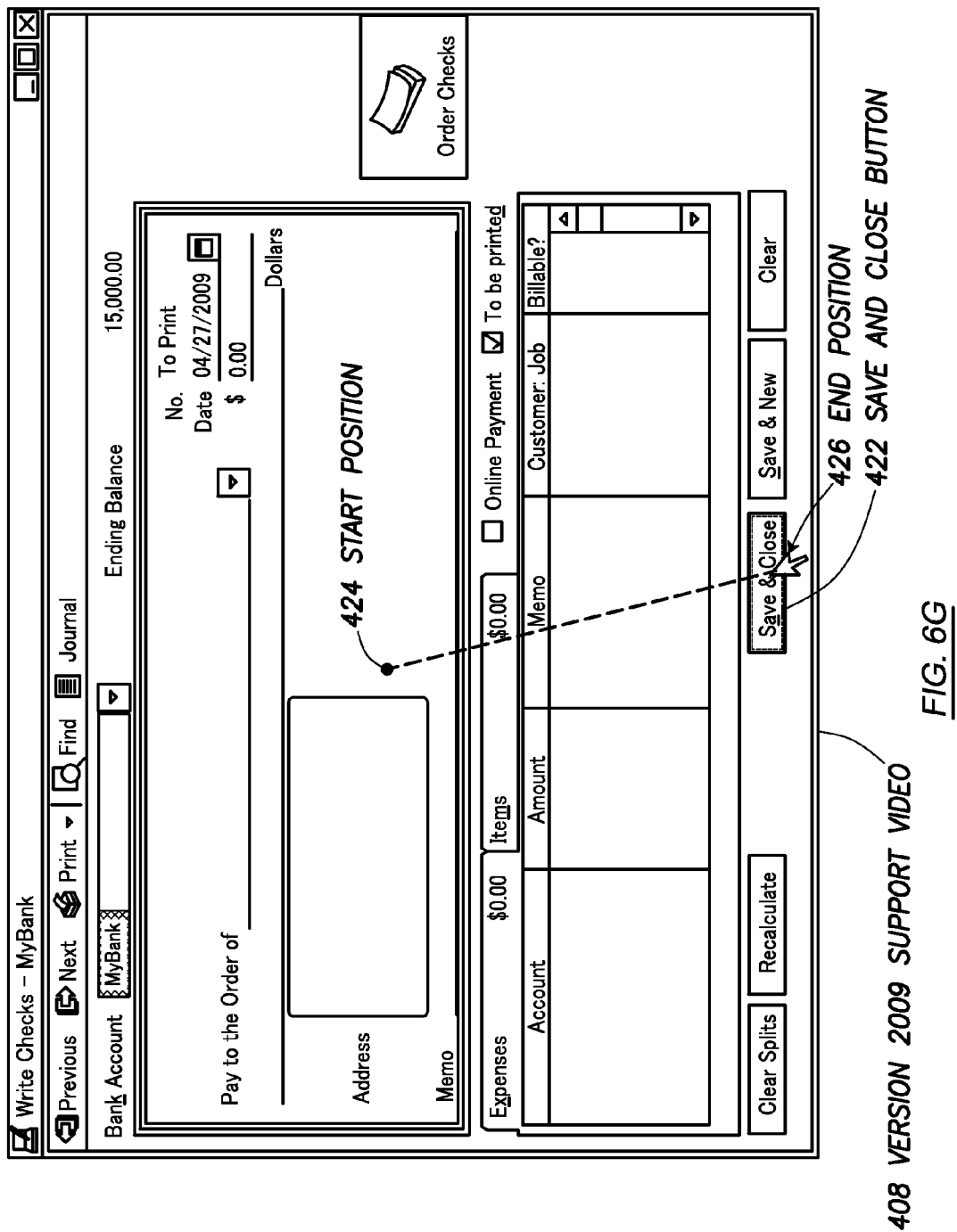

Example FIG. 6G shows the Version 2009 support video when the Version 2009 support video renders the next step of "select, save and close" in accordance with one or more embodiments of the invention. In one or more embodiments of the invention, the Version 2009 renders the step of "select, save and close" by identifying the location of the save and close button (422). Version 2009 support video displays the mouse pointer moving from the start position (424) to the end position (426) over the location of save and close button (422). The Version 2009 support video may then show the selection of the save and close button (422) in accordance with one or more embodiments of the invention. In the example, at this stage, Pete has seen the steps required to write a check. Accordingly, Pete is no longer perplexed.

The following is another example of how the support video may be used. In the following example, consider the scenario in which Paul, the perplexed user, is using a business management application for the Paul's business. While Paul is configuring the business management application for his business, Paul wants to find out how to put the logo on the invoices he sends out for his business.

Accordingly, Paul searches the Help forum for an answer to this question. Paul searches the help forum by using the help menu option in his business management application. He may search the help forum with the question, "How do I put a logo on my invoices?"

The search engine of the help forum responds to Paul's question with a list shown the most likely candidates for answering Paul's question. Next to each candidate in the list may include an icon that indicates to the user what type of help medium the candidate is. For example, an icon representing a piece of paper may indicate that the candidate is a text list of the steps to perform. As another example, a video camera may indicate that the solution is a support video.

Continuing with the example, Paul selects the candidate corresponding to the support video. In the example, the support video was created by Annabel, the assisting user. When Annabel created the support video, Annabel used the professional version of the management application. However, Paul's version of the application is the small business version.

In the example, once Paul selects the support video, Paul's management application downloads the textual based document corresponding to the support video. The textual based document is stored on the Paul's local machine in one or more embodiments of the invention.

Further, the management application automatically opens the textual based document without additional input from Paul and starts translating the textual based document to correspond to Paul's version of the management application. The translation may be performed, for example using a Universal Translation Table (UTT) that contains a list of all the action identifiers and shows how the action identifiers are associated across different versions. The UTT may be stored as a part of the overall video help solution that is included in all versions of the management application. The UTT may also be available via a product update for older versions. Thus, if Paul's version does not have a copy of the most current UTT, Paul's version may download the new copy.

In one or more embodiments of the invention, in the example, the translation is performed as following. The management application takes the textual based document that was downloaded when the Paul clicked that specific video. The management application translates each step from the document and finds the corresponding step in Paul's version of the management application using the UTT on Paul's local machine.

The output is displayed in the management application as a hyperlinked list of steps with the steps translated to match Paul's version. Each step is a "hyperlink" to allow Paul to navigate through the video. Because each step is a hyperlink list, Paul can skip sections of the process that he already knows the first few steps. Specifically, as Paul navigates to the step, the step is played for Paul. More specifically, Paul can watch the mouse pointer move from one section to the screen to the next section of the screen and watch how the menu options are selected. In one or more embodiments of the invention, while Paul is watching the steps being performed in one pane of the management application, Paul can perform the steps himself to add the logo to his invoices. In other words, while the steps are displayed for the management application, Paul can also perform the steps. Thus, Paul can see exactly how to answer his question for his version of the application. Likewise, because the actions can be translated between versions of the application, Annabel's single creation of a support video can help multiple users that have heterogeneous versions of the application.

In one or more embodiments of the invention, the support video may be used, for example, by the vendor of the application. Specifically, a vendor may view the support video and or the inquiry video to analyze how users are using the application. The vendor may then use the analysis as a basis for changes in subsequent versions of the application or in patches for current versions of the application.

Figure 7:
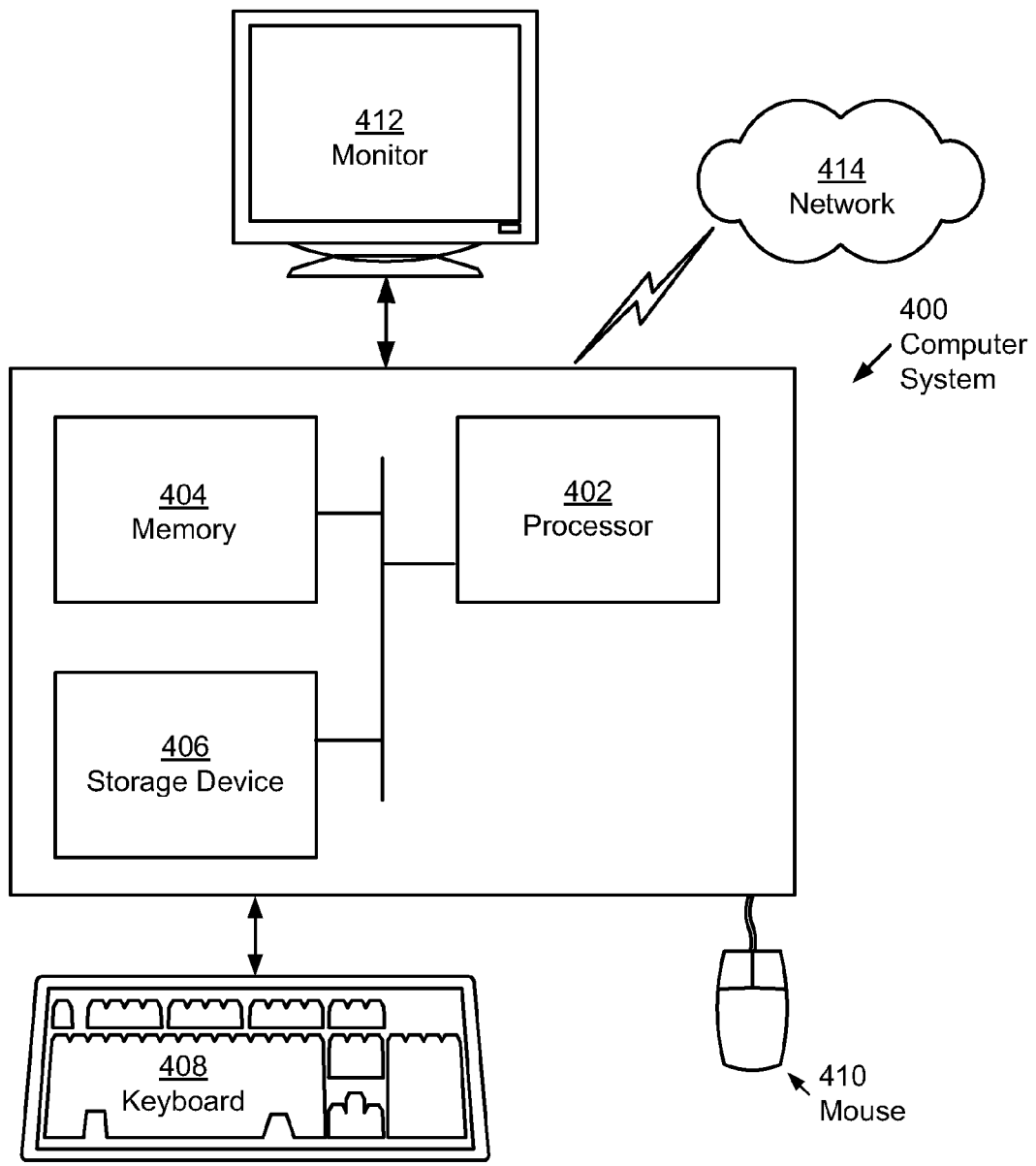
FIG. 7 shows a computer system in accordance with one or more embodiments of the invention.

Embodiments of the invention may be implemented on virtually any type of computer regardless of the platform being used. For example, as shown in FIG. 7, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., application, textual based document, posts, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, flash memory device, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for video sharing between users of an application, comprising:
   receiving, from an assisting user using a first version of the application, a start video command to create a support video;
   generating a textual based document based on the start video command, wherein generating the textual based document comprises, for each action of a plurality of actions performed by the assisting user using the application:
      detecting the action performed by the assisting user on the first version of the application,
      identifying an action identifier uniquely identifying the action performed by the assisting user, and
      storing a step comprising the action identifier in the textual based document,
   wherein the plurality of actions performed by the assisting user in the first version of the application comprise a first version mouse movement from a first location to a second location in the first version;
   receiving a help request from a perplexed user using a second version of the application;
   obtaining the textual based document matching the help request;
   generating the support video from the textual based document by performing for each step in the textual based document:
      obtaining the action identifier from the step in the textual based document,
      identifying an action for the perplexed user mapped to the action identifier, and
      rendering the action in the second version of the application and for the perplexed user into the support video, wherein the action rendered in the support video is a variation of the action performed by the assisting user based on variations between the first version and the second version of the application, and wherein rendering the action in the second version of the application for the perplexed user comprises a second version mouse movement from a third location to a fourth location in the second version; and
   presenting the support video to the perplexed user.

2. The method of claim 1, further comprising:
   receiving an inquiry video from the perplexed user prior to creating the support video, wherein the inquiry video shows a problem encountered by the perplexed user using the application;
   posting the inquiry video in a discussion thread of a help forum, wherein the inquiry video is displayed for the assisting user; and
   posting a link to the support video in the discussion thread, wherein generating the support video is performed in response to receiving a selection of the link.

3. The method of claim 1, further comprising:
   receiving descriptive information describing the support video from the assisting user;
   extracting at least one descriptive keyword from the descriptive information; and
   associating, in a data repository, the at least one descriptive keyword with the support video;
   wherein obtaining the textual based document matching the help request comprises:
      extracting at least one search keyword from the help request;
      searching the data repository with the at least one search keyword to identify a descriptive keyword of the at least one descriptive keyword matching the at least one search keyword; and
      identifying the textual based document associated with the descriptive keyword.

4. The method of claim 1, wherein the application is a financial application, and wherein the support video is presented in a graphical user interface comprised in the financial application.

5. The method of claim 4, wherein the application executes on a local computer system of the perplexed user.

6. The method of claim 1, wherein the support video is presented in a video sharing website.

7. The method of claim 1, wherein the action performed by the assisting user comprises a selection of a graphical user interface component of the application, and wherein the action identifier comprises an identifier of the graphical user interface component.

8. The method of claim 7, wherein generating the textual based document further comprises identifying a parameter for the action performed by the assisting user.

9. The method of claim 7, wherein generating the textual based document further comprises identifying a result of performing the action performed by the assisting user.

10. The method of claim 1, wherein obtaining the textual based document matching the help request comprises:

identifying, based on the help request, a window of the application currently displayed for the perplexed user;
identifying the support video referring to the window; and
presenting a title of the support video to the perplexed user based on the help request.

11. A system for video sharing between users of an application comprising:
a processor;
a data repository comprising a textual based document, wherein the textual based document is generated by, for each action of a plurality of actions performed by an assisting user using a first version of the application:
detecting the action performed by the assisting user on the first version of the application,
identifying an action identifier uniquely identifying the action performed by the assisting user, and
storing a step comprising the action identifier in the textual based document wherein the plurality of actions performed by the assisting user in the first version of the application comprise a first version mouse movement from a first location to a second location in the first version; and
a support video access system executing on the processor, connected to the data repository, and configured to:
receive a help request from a perplexed user using a second version of the application;
obtain the textual based document matching the help request from the data repository;
generate the support video from the textual based document by performing for each step in the textual based document:
obtaining the action identifier from the step in the textual based document,
identifying an action for the perplexed user mapped to the action identifier, and
rendering the action in the second version of the application and for the perplexed user into the support video, wherein the action rendered in the support video is a variation of the action performed by the assisting user based on variations between the first version and the second version of the application, and wherein rendering the action in the second version of the application for the perplexed user comprises a second version mouse movement from a third location to a fourth location in the second version; and
present the support video to the perplexed user.

12. The system of claim 11, wherein the support video access system is further configured to:
receive descriptive information describing the support video from the assisting user;
extract at least one descriptive keyword from the descriptive information; and
associate, in a data repository, the at least one descriptive keyword with the support video,
wherein obtaining the textual based document matching the help request comprises:
extracting at least one search keyword from the help request,
searching the data repository with the at least one search keyword to identify a descriptive keyword of the at least one descriptive keyword matching the at least one search keyword, and
identifying the textual based document associated with the descriptive keyword.

13. The system of claim 11, wherein the support video is presented in a graphical user interface comprised in the application, and wherein the application executes on a local computer system of the perplexed user.

14. The system of claim 11, wherein the textual based document is further generated by:
identifying a parameter for the action performed by the assisting user,
wherein the step further comprises the parameter.

15. The system of claim 11, wherein support video access system is further configured to obtain the textual based document matching the help request by:
identifying, based on the help request, a window of the application currently displayed for the perplexed user;
identifying the support video referring to the window; and
presenting a title of the support video to the perplexed user based on the help request.

16. A non-transitory computer readable storage medium storing instructions for video sharing between users of an application, the instructions executable on a processor and comprising functionality to:
receive a start video command from an assisting user using a first version of the application to create a support video;
generate a textual based document based on the start video command, wherein generating the textual based document comprises, for each action of a plurality of actions performed by the assisting user using the application:
detecting the action performed by the assisting user on the first version of the application,
identifying an action identifier uniquely identifying the action performed by the assisting user, and
storing the action identifier in the textual based document, wherein the plurality of actions performed by the assisting user in the first version of the application comprise a first version mouse movement from a first location to a second location in the first version;
receive a help request from a perplexed user using a second version of the application;
obtain the textual based document matching the help request;
generate the support video from the textual based document by performing for each action identifier in the textual based document:
obtaining the action identifier from the textual based document,
identifying an action for the perplexed user mapped to the action identifier, and
rendering the action in the second version of the application and for the perplexed user into the support video, wherein the action rendered in the support video is a variation of the action performed by the assisting user based on variations between the first version and the second version of the application, and wherein rendering the action in the second version of the application for the perplexed user comprises a second version mouse movement from a third location to a fourth location in the second version; and
present the support video to the perplexed user.

17. The non-transitory computer readable storage medium of claim 16, wherein the instructions to obtain the textual based document matching the help request comprise functionality to:
identify, based on the help request, a window of the application currently displayed for the perplexed user;
identify the support video referring to the window; and present a title of the support video to the perplexed user based on the help request.

* * * * *